United States Patent [19]

Chour et al.

[11] Patent Number: 5,270,793
[45] Date of Patent: Dec. 14, 1993

[54] SYMMETRICAL CARRIER FREQUENCY INTERFEROMETER

[75] Inventors: Matthias Chour, Jena; Mario Netzel, Bransbedra, both of Fed. Rep. of Germany

[73] Assignee: Jenoptik GmbH, Jena, Fed. Rep. of Germany

[21] Appl. No.: 825,926

[22] Filed: Jan. 27, 1992

Related U.S. Application Data

[63] Continuation-in-part of Ser. No. 743,386, Aug. 19, 1991.

[30] Foreign Application Priority Data

Dec. 27, 1990 [DE] Fed. Rep. of Germany ....... 3366262

[51] Int. Cl.$^5$ .............................................. G01B 11/02
[52] U.S. Cl. ..................... 356/358; 356/349; 356/351; 356/356
[58] Field of Search ................ 356/349, 358, 351, 356

[56] References Cited

U.S. PATENT DOCUMENTS

| | | | |
|---|---|---|---|
| 4,746,216 | 5/1988 | Sommargren | 356/349 |
| 4,802,764 | 2/1989 | Young et al. | 356/349 |
| 4,807,997 | 2/1989 | Sommargren | 356/349 |

Primary Examiner—Samuel A. Turner
Assistant Examiner—LaCharles P. Keesee
Attorney, Agent, or Firm—McAulay, Fisher, Nissen, Goldberg & Kiel

[57] ABSTRACT

Symmetrical carrier frequency interferometer for length, distance and speed measurements with beam-deflecting and beam-splitting elements, as well as a fixed reference mirror and a movable measurement mirror. The optically active surfaces positioned downstream of a first polarization-splitting layer are arranged in mirror-symmetrical manner with respect to the latter. Upstream of a second polarization-splitting layer inclined by 45° a $\lambda/2$ plate is located in one of the two beam paths and in the passage direction behind said layer are located the $\lambda/4$ plate, the fixed reference mirror and the movable measurement mirror. There is at least one reversing element in the reflection direction.

22 Claims, 1 Drawing Sheet

SYMMETRICAL CARRIER FREQUENCY INTERFEROMETER

CROSS REFERENCE TO RELATED APPLICATIONS

This is a continuation-in-part application of U.S. application Ser. No. 743,386 filed Aug. 19, 1991 based on PCT application PCT/EP90/02318.

BACKGROUND OF THE INVENTION a) Technical Field

The invention can be used in the most varied branches of industry for measuring lengths, distances and speeds. The inventive carrier frequency interferometer can be used with particular advantage where high object speeds, e.g. rotary and translatory movements occur on ultraprecision working machines in the case of high incremental resolutions.

b) Prior Art

Leading measurement system manufacturers traditionally use asymmetrical carrier frequency interferometers (SPIE, vol. 480, pp 78-83, May 1984; U.S. Pat. No. 47 11 547; U.S. Pat. No. 47 52 133). As a result of the asymmetry, the reference and measurement channels have a different temperature dependency, which makes them unsuitable for nanometer measurement systems. The diagonal beam emergence of the measurement beam relative to the reference beams does not make it possible to position the reference mirror outside or above the movement path of the measurement mirror. As a result of return intensity into the light source, its stability is impaired. Possible tilting of the primary beam leads to divergences of the measurement and reference beams, which once again influence the measuring signal.

SUMMARY OF THE INVENTION

The aim of the invention is to make it possible to very accurately measure distances, lengths and speeds using simple means.

An object of the invention is to develop a feedback-free, temperature invariant carrier frequency interferometer. According to the invention this problem is solved by a symmetrical carrier frequency interferometer with beam-deflecting and beam-splitting elements, as well as a fixed reference mirror and a movable measurement mirror, which is characterized in that the optically effective surfaces following the first polarization-splitting layer are positioned in mirror symmetrical manner with respect thereto, that a λ/2 plate is located in one of the two beam paths upstream of a second polarization-splitting layer inclined by 45° and at a corresponding equivalent point in the other partial beam path is provided a plate for compensating the optical glass path, that behind the second polarization-splitting layer in the passage direction thereof are located a λ/4 plate, the fixed reference mirror and the movable measurement mirror, while there is at least one reversing element in the reflection direction.

Advantageously, the polarization-splitting layers are made from thin dielectric material and the plate for compensating the optical glass path is from quartz glass. The measurement mirror must be arranged in one-dimensional movable manner in the beam direction. The reversing elements can be triple prisms.

The particular advantage of this carrier frequency interferometer is its temperature invariance and the minimum feedback of light into the light source due to the construction according to the invention.

For a better understanding of the present invention, reference is made to the following description and accompanying drawings while the scope of the invention will be pointed out in the appended claims.

DESCRIPTION OF THE DRAWING

The drawing shows an advantageous construction of the inventive carrier frequency interferometer in an exploded view and in which the references have the following meanings:

A': vertically polarized component of the laser light
A": horizontally polarized component of the laser light
$f_1$: frequency of component A'
$f_2$: frequency of component A"
$\Delta f_2$: frequency change of component A" by the Doppler effect
A $(f_1 f_2)$: entering beam
A $(f_1 f_2 \pm \Delta f_2)$: emerging beam The following are located in the beam entrance:
1 deflecting system
2 polarization-splitting layer
3 λ/2 plate
4 plate
5 polarization-splitting cube
6 λ/4 plate
7 movable measurement mirror
8 fixed reference mirror
9 first triple prism
10 second triple prism

DETAILED DESCRIPTION OF THE INVENTION

Figure 1:
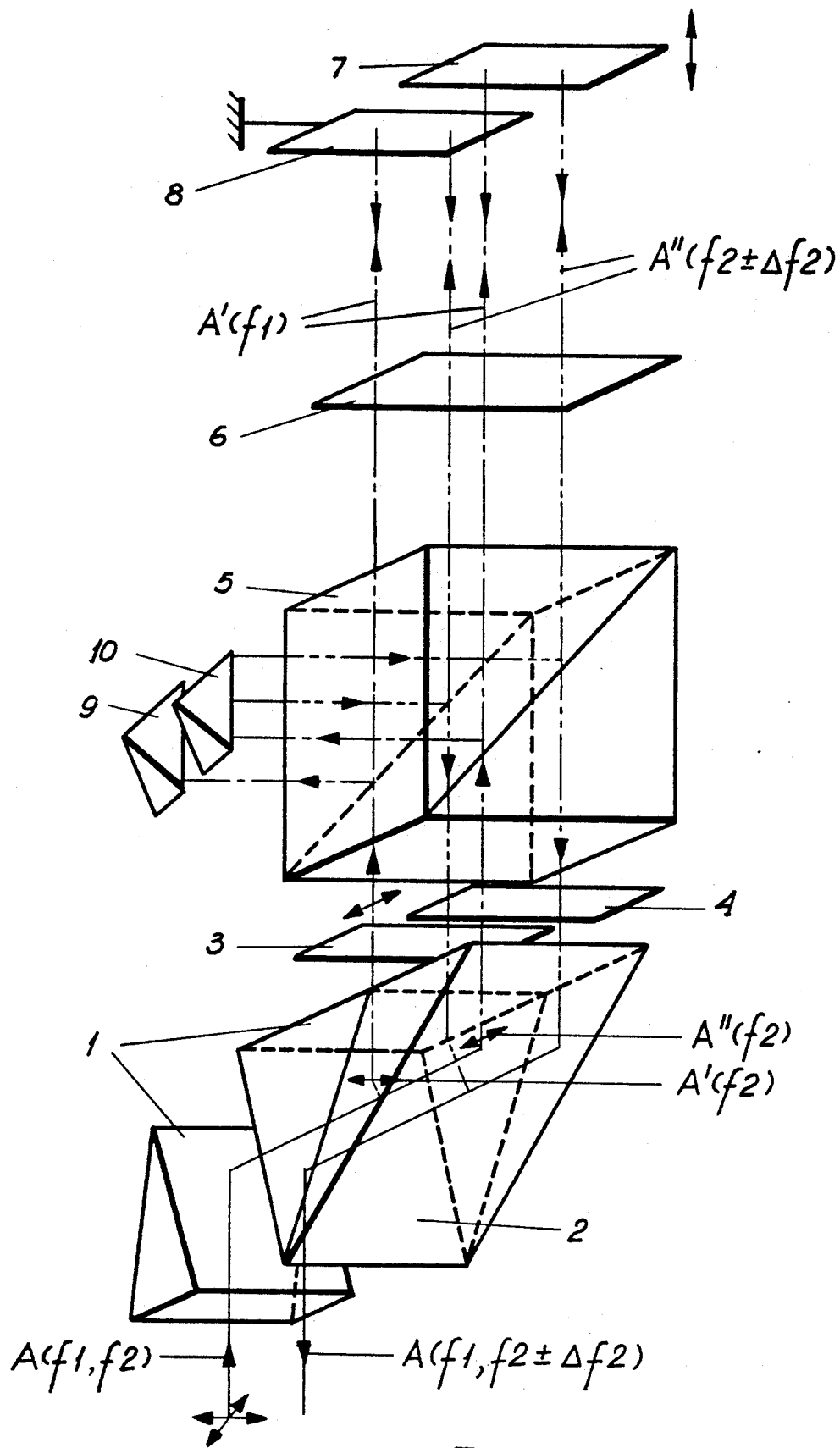

The advantageous construction of the inventive carrier frequency interferometer comprises, according to the drawing, a deflecting system 1 with a first polarization-splitting layer 2, a λ/2 plate 3 and a plate 4, which are juxtaposed following the exit face of the deflecting system 1, a polarization-splitting cube 5 with a second polarization-splitting layer, followed in the light passage direction by a λ/4 plate 6 and a fixed reference mirror 8 beside a movable measurement mirror 7, together with a first and a second triple prisms 9 and 10 as reversing elements. The polarization-splitting layers are made from thin dielectric material and the plate 4 from quartz glass. The measurement mirror 7 is arranged in one-dimensional movable manner in the beam direction. Apart from the fixed reference mirror 8 and the movable measurement mirror 7, all the elements constitute a compact firmly interconnected unit.

For performing the measurement use is made of a laser, which emits two modes polarized perpendicular to one another and having different frequencies. The parallel laser beam striking the deflecting system 1 is split into its components A' and A" at the polarization-splitting layer 2 (A' being vertically and A" horizontally linearly polarized), which pass through the inventive carrier frequency interferometer as parallel beam paths. The vertically polarized component A' passes through the λ/2 plate 3, is rotated by 90°, passes through the polarization-splitting cube 5 and the λ/4 plate 6 and is reflected on the fixed reference mirror 8. After again passing through the λ/4 plate 6, the polarization plane of A' is rotated by 90° and is therefore totally reflected on the splitting layer of the polarization cube 5. The first triple prism 9 displaces the beam about the double beam diameter and returns it to the splitting layer of the polarization-splitting cube 5. Thus, the beam is reflected a second time by the fixed reference mirror 8 and is rotated by 90° by the double passage of the λ/4 plate 6, so that the polarization splitting cube 5 becomes transparent for A'. The λ/2 plate 3 rotates A' into its original polarization plane. A' is reflected in the deflecting system 1 and emerges again laterally parallel to the entering beam A ($f_1$, $f_2$).

An almost identical beam path applies to the horizontally polarized component A" due to the symmetrical construction. Only as a result of the λ/2 plate 3 is a plate 4 located in the optical path, so as to keep the glass paths identical for A' and A". As a result of the displacement, the reflection on the movable measurement mirror 7 leads to the Doppler frequency acting on the frequency $f_2$ of the beam component A". A' and A" are superimposed in the polarization-splitting layer and leave the carrier frequency interferometer polarized colinearly and perpendicular to beam then has the frequencies $f_1$ and $f_2 \pm \Delta f_2$. For evaluating the Doppler frequency e.g. by avalanche diodes, the polarization directions are made to overlap by a polarizer rotated by 45°.

A resolution of λ/4 is obtained by traversing four times the varying path (by displacement of the movable measurement mirror 7). Real optical resolutions of λ/18 to λ/16 can be achieved by a corresponding development and variation of this proposal.

A more specific preferred embodiment is now described. For the laser, a thermally regulated, inner mirror He-Ne gas laser can be utilized. The frequencies $f_1 f_2$ of the beam are in the vicinity of $4.737 \cdot 10^{14}$ Hz (corresponding to a physical wavelength of $\lambda \approx 633$ nm); the difference between the two frequencies is $f_1 - f_2 = 633.9$ MHz.

The λ/2 plate 3 is preferably composed of quartz glass with a crystal orientation which acts so as to rotate the polarity by 90° for incident waves. The plate 4 similarly is preferably composed of quartz glass which, however, does not act so as to rotate the polarity, but has the same refraction index as the material of the λ/2 plate 3.

The base bodies of the measuring mirror 7 and the reference mirror 8 are composed of quartz glass or Zerodur which is aluminized with an aluminum reflex coating as mirror surface. The smoothness of the mirror surface should be λ/12 or better.

Total-reflecting, highly smooth ridge prisms comprising the optical material BK7 are preferably used as triple prisms 9, 10. They can be cemented on the polarization divider cube 5 in a direction-dependent manner. With respect to construction, the polarization-dividing layers correspond to known or standardized optical polarization-dividing layers.

It is an important feature of the invention that the optically active (beam-reversing) surfaces arranged immediately subsequent to the first polarization-dividing layer 2 are arranged in a mirror-symmetric manner relative to the polarization-dividing layer 2.

It is to be noted that the plate 4 ensures glass paths of equal length in the beam paths. The beam guidance for the measuring beam (A") and the reference beam (A') is effected in separate planes which are aligned parallel to each other. The measurement beam (A") does not undergo any rotation by means of the plate 4, while the reference beam (A') is rotated twice by 90° in the equivalent portion of the arrangement (λ/2 plate 3).

While the foregoing description and drawings represent the preferred embodiments of the present invention, it will be obvious to those skilled in the art that various changes and modifications may be made therein without departing from the true spirit and scope of the present invention.

What is claimed is:

1. In a symmetrical carrier frequency interferometer having one beam deflecting element and one beam-splitting element, as well as a fixed reference mirror and a movable measurement mirror, the improvement comprising:

a first polarization-splitting layer in the beam-splitting element for splitting an input beam into first and second beams which travel in first and second beam paths, respectively, said first polarization-splitting layer defining a symmetry plane;

second polarization-splitting layers in the beam-splitting element, inclined by 45° to said first and second beam paths and positioned symmetrical to each other about said symmetry plane, said first and second beams travelling in a beam direction after contacting said second layers;

one λ/2 plate being located between the beam deflecting element and the beam-splitting element in said first beam path;

one optical glass path compensating plate being located in said second beam path at a position symmetrical to said λ/2 plate about said symmetry plane;

a λ/4 plate positioned symmetrically about said symmetry plane behind said second polarization-splitting layer;

the fixed reference mirror and the movable measurement mirror being located behind the second polarization-splitting layer in a passage direction thereof, said reference mirror positioned symmetrical to said measurement mirror about said symmetry plane; and at least one reversing element being disposed in a reflection direction and positioned symmetrically about said symmetry plane.

2. The symmetrical carrier frequency interferometer according to claim 1 wherein the polarization-splitting layers are constructed from thin dielectric material.

3. The symmetrical carrier frequency interferometer of claim 1 wherein said plate for compensating the optical glass path is constructed from quartz glass.

4. The symmetrical carrier frequency interferometer of claim 1 wherein the movable measurement mirror is mounted so as to be movable in one dimension in the beam direction.

5. The symmetrical carrier frequency interferometer of claim 1 wherein triple prisms are provided as reversing elements.

6. A symmetrical carrier frequency interferometer comprising the following elements in beam-direction order:

a beam deflecting system for receiving an input beam, said beam deflecting system having a first polarization-splitting layer for splitting said input beam into two parallel orthogonally polarized beams and an exit face, said first polarization-splitting layer defining a symmetry plane;

one λ/2 plate being located in the path of one of said two parallel beams following said exit face of said deflecting system;

one compensating plate adjacent to said λ/2 plate following said exit face of said deflecting system;

a polarization-splitting cube provided as a beam-splitting element and having a second polarization-splitting layer;

a λ/4 plate following said polarization-splitting cube;

a pair of mirrors following said λ/4 plate, one of said mirrors being a fixed reference mirror, the other of said mirrors being movable in the beam direction; and a pair of reflecting elements operating in conjunction with said polarization-splitting cube, wherein said λ/2 plate is positioned symmetrically to said compensating plate about said symmetry plane, said λ/4 is positioned symmetrically about said symmetry plane, said reference mirror is positioned symmetrically to said measurement mirror about said symmetry plane, and said reflecting elements are positioned symmetrically with respect to said symmetry plane.

7. The interferometer according to claim 6 wherein said reflecting elements are triple prisms.

8. The interferometer of claim 6 wherein said second polarization splitting layer is inclined by 45° relative to the beam direction.

9. The interferometer of claim 6 wherein said polarization layers are made from thin dielectric material.

10. The interferometer of claim 6 wherein said compensating plate is composed of quartz glass.

11. A measuring system employing a symmetrical carrier frequency interferometer comprising:

a laser source for emitting a beam having two modes that are polarized, perpendicular to each other, and having different frequencies;

a symmetrical carrier frequency interferometer including the following elements in beam-direction order:

a beam defecting system for receiving an input beam, said beam deflecting system having a first polarization-splitting layer for splitting said input beam into two parallel orthogonally polarized beams and an exit face, said first polarization-splitting layer defining a symmetry plane;

one λ/2 plate being located in the path of one of said two parallel beams following said exit face of said deflecting system;

one compensating plate adjacent to said λ/2 plate following said exit face of said deflecting system;

a polarization-splitting cube provided as a beam-splitting element and having a second polarization-splitting layer;

a λ/4 plate following said polarization-splitting cube;

a pair of mirrors following said λ/4 plate, one of said mirrors being a fixed reference mirror, the other of said mirrors being movable in the beam direction; and a pair of reflecting elements operating in conjunction with said polarization-splitting cube, wherein said λ/2 plate is positioned symmetrically to said compensating plate about said symmetry plane, said λ/4 is positioned symmetrically about said symmetry plane, said reference mirror is positioned symmetrically to said measurement mirror about said symmetry plane, and said reflecting elements are positioned symmetrically with respect to said symmetry plane.

12. The system according to claim 14 wherein said polarization elements are triple prisms.

13. The system of claim 11 wherein said second polarization splitting layer is inclined by 45° relative to the beam direction.

14. The system of claim 12 wherein said polarization layers are made from thin dielectric material.

15. The system of claim 11 wherein said compensating plate is composed of quartz glass.

16. The system of claim 11 wherein said laser source is a He-Ne gas laser.

17. The system of claim 16 wherein said He-Ne gas laser is thermally regulated and has an inner mirror construction.

18. The system of claim 16 wherein the operating frequencies of said laser are in the vicinity of $4.737 \cdot 10^{14}$ Hz ($\lambda = 633$ nm).

19. The system of claim 15 wherein the difference between the two operating frequencies is approximately 633.9 MHz.

20. The system of claim 11 wherein said λ/2 plate is composed of quartz glass.

21. The system of claim 20 wherein said λ/2 plate is adapted to rotate the polarization plane of incident light waves by 90°.

22. The system of claim 20 wherein said λ/4 plate is composed of quartz glass, the quartz glass of the λ/2 plate and λ/4 plate having the same index of refraction.

* * * * *